(12) United States Patent
Elliott

(10) Patent No.: US 6,598,266 B1
(45) Date of Patent: Jul. 29, 2003

(54) HANDLE FOR A MANUALLY OPERATED IMPLEMENT AND METHOD

(76) Inventor: Olin S. Elliott, P.O. Box 8675, Greenville, SC (US) 29604

( * ) Notice: Subject to any disclaimer, the term of this patent is extended or adjusted under 35 U.S.C. 154(b) by 0 days.

(21) Appl. No.: 09/607,308

(22) Filed: Jun. 29, 2000

(51) Int. Cl.[7] .............................. B25G 1/04; A45C 13/22
(52) U.S. Cl. .............................. 16/430; 16/426; 16/436; 16/901
(58) Field of Search .................. 16/430, 436, 901, 16/426, 427; 294/19.1, 25, 51, 57, 58; 43/25, 23; 15/144.1, 145

(56) References Cited

U.S. PATENT DOCUMENTS

| 4,540,943 A | * | 9/1985 | Akers .......................... 16/280 |
| 4,822,087 A | * | 4/1989 | DeCarlo ....................... 16/426 |
| 4,924,924 A | * | 5/1990 | Stewart ........................ 16/426 |
| 5,529,357 A | * | 6/1996 | Hoffman ....................... 16/427 |
| 5,682,641 A | * | 11/1997 | Newman, Jr. et al. ........ 16/429 |
| 5,983,455 A | * | 11/1999 | Polzin et al. ................. 16/429 |
| 6,050,626 A | * | 4/2000 | Dudley ........................ 294/61 |
| 6,082,795 A | * | 7/2000 | Fornelli ....................... 16/422 |

* cited by examiner

*Primary Examiner*—Chuck Y. Mah
(74) *Attorney, Agent, or Firm*—Ralph Bailey, P.A.

(57) ABSTRACT

A handle and method for use with a manually operated implement including an elongated tubular frame (A) with a holder (B) at one end for receiving a shank portion of the implement against rotation and movement in and out with respect to the holder and for achieving a two-point control by the user through a slidable support (C) opposite the holder and an intermediate upright hand grip (D), a strap (E) carried by a support (C) being provided for encompassing an arm of the user just below the elbow facilitating the application of force upwardly and downwardly as well as in and out through the implement.

11 Claims, 3 Drawing Sheets

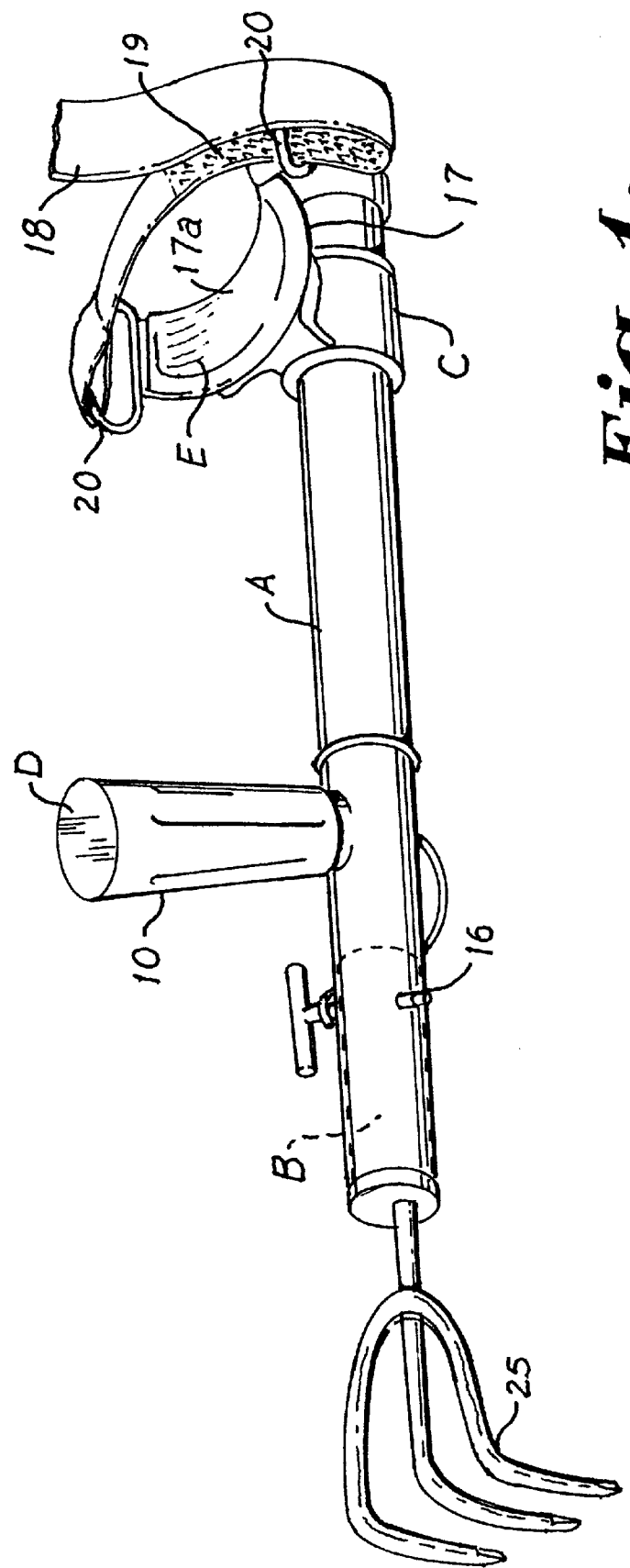

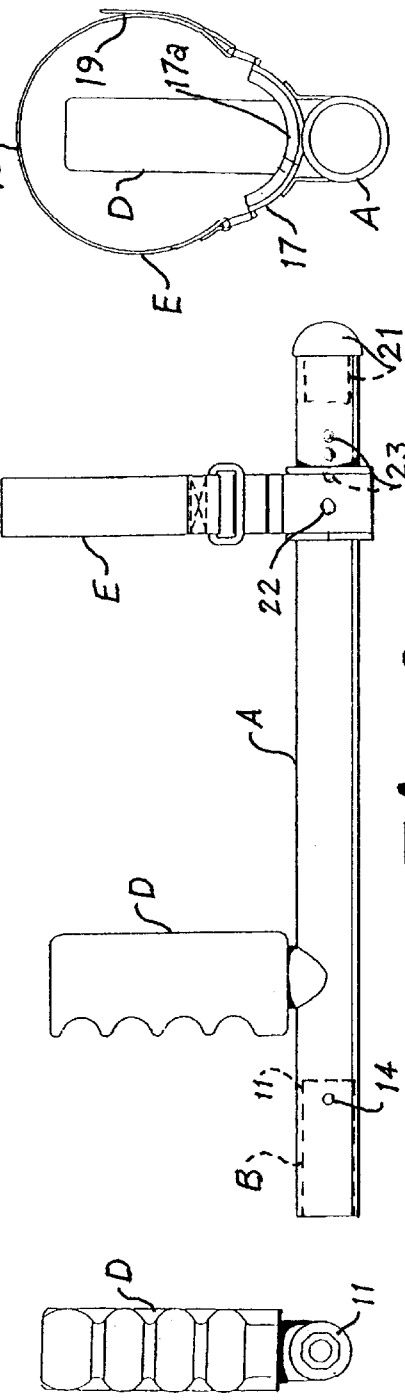

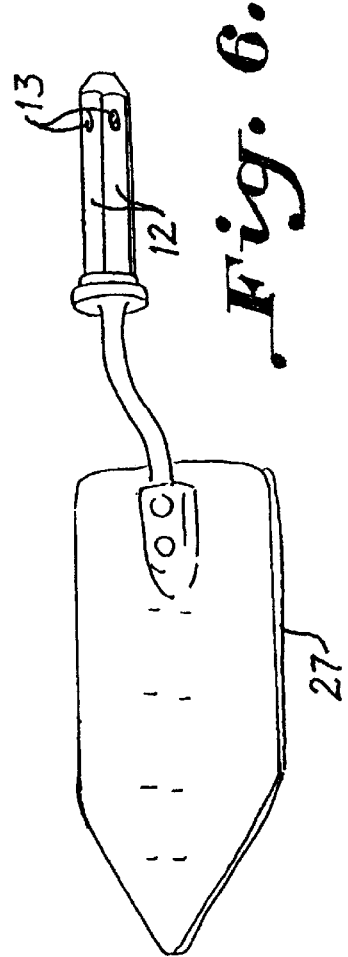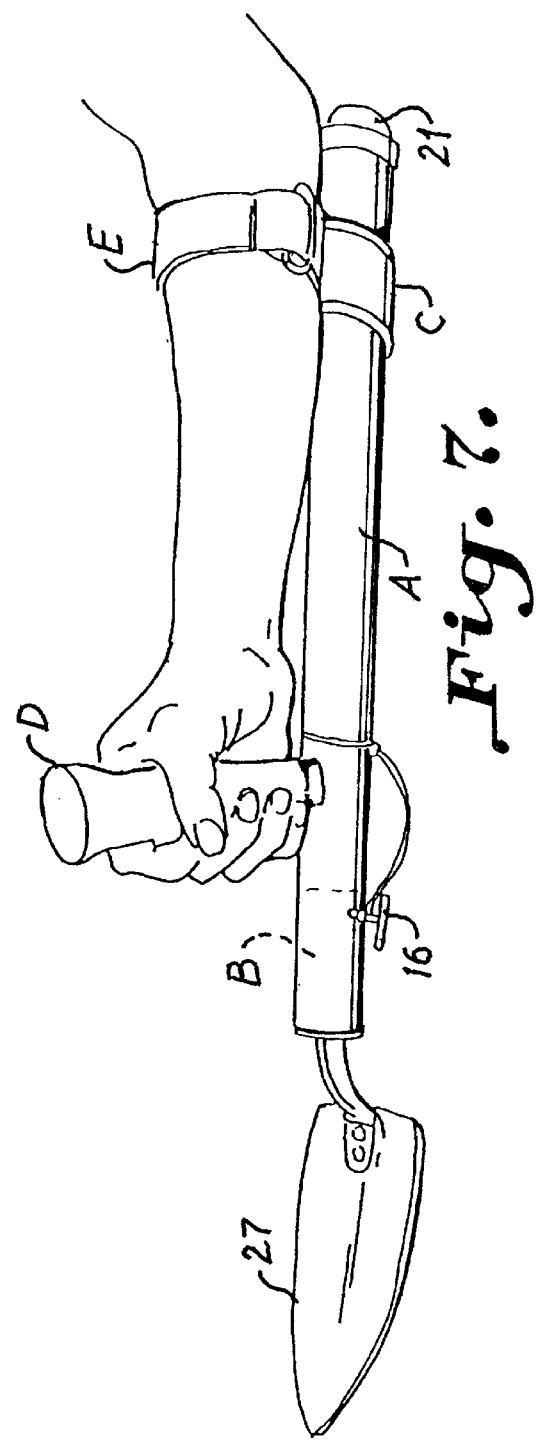

HANDLE FOR A MANUALLY OPERATED IMPLEMENT AND METHOD

BACKGROUND OF THE INVENTION

This invention relates to a handle for facilitating manual operation of a variety of tools or implements including those relating to gardening and household tasks and method.

The prior art is exemplified by U.S. Pat. Nos. 5,813,206 and 5,937,627, both of which relate to handles or holders for gardening implements providing enhanced leverage capabilities through the use of an elongated frame having an implement holder on one end and a stirrup resting on the wrist or forearm at the other end and including a handle grip carried by the frame intermediate its ends.

The gardening tool of the patents is only capable of exerting a downward force for digging and raking, utilizing an implement disposed at substantially right angles to the frame. The stirrup rests on the forearm just above the wrist. A leveraged force is developed when the implement is forcefully moved downwardly into the ground. No provision is made to facilitate the application of an upward force, or for aiding in the application of a force for pushing and pulling, or for rotating the implement or for applying a force at an angle to the horizontal since the stirrup is only capable of applying a force in one direction. No provision is made for utilizing a hollow frame member for receiving an implement shank so that use of a chuck for holding the shank of the tool is necessitated. A relatively heavy expensive chuck would be required for effectively positioning a tool. Moreover, adjustment of the longitudinal positioning of the stirrup is impossible because of its integral mounting on the frame. Therefore, the length of the lever arm through which force is multiplied is limited by the fixed positioning of the stirrup adjacent the wrist.

The prior art further includes U.S. Pat. Nos. 712,843, 2,482,589, 2,710,571, 4,888,846, and 5,529,357.

SUMMARY OF THE INVENTION

Accordingly, it is an important object of the invention to provide a handle or holder for improving the performance of a manually operated implement by providing an elongated frame having an implement holder at one end and an arm support at the other end for engaging the arm of a user just below the elbow, and including a hand grip intermediate the implement on one end and the arm support on the other. By engaging the arm just below the elbow a lever arm is provided increasing the force that may be imparted to the implement.

Another important object of the invention is to provide a tool holding device or handle which will be ergonomically suited to use in gardening and in other household and general work applications involving the manual use of an implement or tool.

Another important object of the invention is to provide a handle for a manually operated implement which is versatile in that a wide variety of tools or implements may be positioned on one end of an elongated frame for receiving leveraged forces exerted from two-point securement by the hand and adjacent the elbow of the user.

Another important object of the invention is to permit the application of leveraged force to the work through an implement carried by the handle in any direction through the center line of the handle.

Another important object of the invention is to provide for a two-point control of a manually operated tool through the hand and forearm of the user who may exert increased forces through manipulation by either the left or right hand.

Still another important object of the invention is to provide for both pushing and pulling motions through a tool with a handle which affords a two-point control through the hand and arm of the user with enhanced leverage for multiplying the forces exerted by the user.

Another object of the invention is to provide a light weight, generally hollow inexpensive handle for manual tool manipulation utilizing a generally tubular section closed on at least three sides.

Another object of the invention is to facilitate the attachment of a wide variety of tools having multi-faceted shanks carried within a longitudinal bushing having a complimentary interior surface acting as stops for fixing the shank against rotation within one end of a frame having an elongated member with a circular cross-section.

Yet another object of the invention is to provide suitable means for limiting longitudinal movement of a variety of tool shanks and to permit a selected tool angle with respect to the longitudinal axis of the frame.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a handle for manually operating a rake having an elongated aligned shank wherein a two-point control of the implement is achieved utilizing an elongated frame holding the rake at one end and an arm engaging support at the other end for securement to the arm of the user just below the elbow constructed in accordance with the invention;

FIG. 2 is a side elevation further illustrating the apparatus constructed in accordance with the invention;

FIG. 3 is front elevation of the frame and handle illustrating a sleeve having a circular outside surface and a hexagonal interior surface adapted to be press fitted into an open end of the frame;

FIG. 3-A is a side elevation further illustrating the sleeve of FIG. 3;

FIG. 4 is an end view looking toward the right-hand end of FIG. 2 illustrating a strap for engaging an encircling the forearm of the user just below the elbow;

FIG. 5 is a side elevation of the frame illustrating the use of an implement in the form of a hoe;

FIG. 6 is a perspective view illustrating a trowel having a hexagonal shank suitable for reception within the holder at an open end of the frame; and FIG. 7 is a perspective view illustrating the apparatus constructed in accordance with the invention equipped with a trowel for a two-point control by the user and wherein an intermediator hand grip is tilted slightly forwardly to improve the ergonomics of the handle over extended periods of use.

DESCRIPTION OF A PREFERRED EMBODIMENT

A handle for a manually operated implement provided with an aligned shank has an elongated frame A which preferably includes a hollow structural shape. A holder B at one end of the elongated frame has a multi-faceted internal surface providing stops for engaging the shank against rotation and for angular adjustment of the implement about a longitudinal axis. A support C is carried by the elongated tubular frame on a portion of the elongated frame on the other end opposite the implement. An upright hand grip D is carried intermediate the ends of the elongated frame in spaced relation to the implement for gripping by the hand of a user. An arm receiving member E is carried by the support engaging and encircling the arm adjacent the elbow. The handle is thus engagable at multiple locations by the user.

The elongated frame A is constructed from a generally closed structural section preferably a single length of tubular material that is preferably aluminum and of circular cross section. While dimensions are not critical, a suitable frame length may be approximately 15 inches long and having a 1.05 inch outside diameter. A second piece of tubular aluminum approximately 4 inches long may have an outside diameter of 0.75 inches for utilization as a hand grip D. The hand grip D is welded at an angle extending slightly forward in relation to the frame for comfortable prolonged use at approximately 3 inches from an open end of the frame. The hand grip D may include a handle bar or cushion 10 as illustrated in the drawings.

A holder B includes a bushing 11 illustrated in FIG. 3-A which may be press fitted in the open end of the tubular frame. Each of the implements adapted for use with the apparatus preferably includes an elongated shank 12 having an hexagonal outer surface adapted to be received within a complementary inner surface of the bushing 11. The shank 12 is equipped with a pin receiving opening 13(FIG. 6) on each of the respective longitudinal facets adapted for transverse alignment with an opening 14 within the tubular frame and extending through the sleeve as illustrated as at 15 in FIG. 3-A. A pin 16 is provided for reception by transversly aligned openings 13, 14 and 15 as shown in FIG. 1.

A support C that is preferably slidable on the frame A, comprises a ring of suitable material such as nylon. The ring is carried on the elongated tube, being slidable on the greater part of the tube remote from the tool. The tool is illustrated as a rake 25 in FIG. 1. The ring has an arm rest 17 preferably provided with a cushion 17a and arm strap 18 to encircle the forearm just below and adjacent to the elbow. The strap 18 is provided with a suitable fastener such as velcro 19 on a suitable length of strap at least one end for providing opposed velcro fastening surfaces. The strap is carried on the free ends of the arcuate arm rest on the loops 20. A transverse pin (not shown), that may be similar to the pin 16, may be passed through a transverse opening 22 in the ring C and a selected opening of the aligned openings 23 in the frame, as shown in FIG. 2. The assembly provides fixed positioning for accommodating the users arm affording maximum length to the lever arm afforded by the frame. However, the handle can be used without the support C being pinned in place, but allowed to slide freely. The strap can be pulled tight or left slightly loose as the user desires.

By utilizing the strap and arm rest for encircling the arm the handle provides a complete stabilized unit in relation to the working head of the tool or implement and aids in multiplying the work force in all directions, i.e., up, down, or left and right as well as back and forth.

The handle grip and the support including the arm strap provide the two-point control of the tool carried by the handle.

A plug 21 in the rear of the tube keeps the slide ring from coming off of the frame and provides a smooth rounded end facilitating two handed use for particularly difficult digging.

The particular tool to be used with the handle is preferably equipped with a hexagonal shank for insertion into the complimentary bushing opening. The matching hexagonal shapes act as stops keep the tool from rotating within the bushing. It will also allow the tool to be adjustably positioned every 45 degrees around the end of the tube or in six different planes in relation to the hand grip. Intersecting holes 15 are drilled through. the tool shank to align with the hole 14 in the handle. This allows a pin 16 preferably with a T-handle to be run through the handle and the mandrel of the tool at all possible positions to fix the tool securely in the handle against both pushing and pulling motions. This configuration of the through pin 16 is preferred because it is the easiest to use, and most positive in application.

The apparatus described makes the tool and the handle one working unit for the duration of the use of that particular tool. A variety of tools all with the same shank configuration should be available for use with the handle as illustrated as a rake 25 in FIG. 1, a hoe 26 in FIG. 5 and a trowel 27 in FIGS. 6 and 7.

Hand tools are often equipped with one basic type of handle. Round or formed shapes which are gripped with the entire hand while using the tool are common. The pressures of the use of the tool are all directly passed to the fingers and wrist. The thumb is particularly subject to stress.

Handles constructed in accordance with the invention do not require that the fingers maintain a grip on the handle. The fingers do not have to grip tightly to control the tool and the pressures of the work are transferred to the arm hand unit and the wrist and thumb are relieved of much of their accustomed stress.

Any of a considerable variety of tool shapes and purposes can be made for use with the tool holding devices of the invention. It is thought that this system will be especially useful in gardening tools. However, industrial tools and law enforcement devices also may be considered as potential applications using different tools or implements as may be useful with the strap encircling the arm just below the elbow facilitating control of this implement.

While a preferred embodiment of the invention has been described using specific terms, such description is for illustrative purposes only, and it is to be understood that changes and variations may be made without departing from the spirit or scope of the following claims.

What is claimed is:

1. A handle for a manually operated implement having a shank comprising:

a single straight length of tubing having a circular cross section forming an elongated frame;

a holder at one end of the elongated frame in spaced relation to the implement for removably securing the shank of the implement to the elongated frame;

an upright hand grip carried by the elongated frame in spaced relation to the implement for gripping by the hand of a user;

a support carried by the elongated frame encircling the single length of tubing adjacent to the other end of the elongated frame opposite the implement for longitudinal sliding movement on the frame for positioning the support for facilitating engagement of the upright hand grip by the hand of the user;

an arm receiving apparatus carried by the support in longitudinal alignment with the hand grip for restraining the arm adjacent and below the elbow of the user against movement up and down with respect to the frame; and an interlocking apparatus between the support and the frame for fixing the support in longitudinally adjusted position on the frame;

whereby the arm receiving apparatus is fixed in axial alignment with the support engaging the arm for exerting an axial force on the implement without the necessity of tightly gripping the upright hand grip by the hand of the user by reason of axial alignment, while avoiding the use of multiple telescoping frames for adjustment of the support.

2. The handle set forth in claim 1, further including:

an implement having a shank with a multi-faceted external surface; a bushing in a forward end of the frame having a multi-faceted internal surface corresponding to the external facets of the implement shank; and an interlocking apparatus extending through the holder and into the implement shank avoiding relative rotation and longitudinal movement between the implement shank and the holder.

3. The handle set forth in claim 2 wherein the multi-faceted surfaces of the implement shank have openings for receiving the interlocking apparatus for fixing the shank and the implement carried thereby in multiple angular positions relative to the frame.

4. The handle set forth in claim 2 wherein said support is longitudinally slidable on the frame.

5. The handle set forth in claim 1 including a transverse member extending through a transverse opening in the support and engaging the frame fixing the support in an adjusted position on the frame.

6. The handle set forth in claim 1 wherein the receiving apparatus includes a fastenable strap having overlapping ends encircling the forearm of the user adjacent the elbow that can be pulled tightly about the forearm.

7. The handle set forth in claim 6 wherein the receiving apparatus includes an arcuate arm rest fixed intermediate the ends to the slidable support and having upwardly extending free ends for carrying the strap.

8. The handle set forth in claim 1 wherein the hand grip is inclined slightly forwardly toward the implement for the comfort of the user.

9. The method of manually operating an implement having an aligned shank comprising the steps of:

utilizing a single straight length of a tubular member to form a tubular frame;

engaging the aligned shank in one end of the tubular member in axial alignment therewith against rotation and relative longitudinal movement;

engaging an upright hand grip carried by the elongated frame in spaced relation to the implement by the hand of the user;

mounting a support slidably encircling the straight length of tubing at the other end of the frame remote from the implement for adjustably positioning the support longitudinally on the frame; and encompassing the arm of a user by a receiving member adjacent to and below the elbow of the user carried by the support in axial alignment with the hand grip and with the shank;

whereby the supplement is engagable at multiple locations on the tubular frame.

10. The method of operating an implement set forth in claim 9 including the step of providing adjustable stops for adjustably fixing the angular position of the shank against rotation within the tubular frame.

11. The method of operating an implement set forth in claim 9 including the step of slidably mounting the support on the tubular frame.

* * * * *